United States Patent
Li et al.

(10) Patent No.: US 8,963,174 B2
(45) Date of Patent: Feb. 24, 2015

(54) TFT-LCD ARRAY SUBSTRATE AND DISPLAY DEVICE

(71) Applicant: Beijing BOE Optoelectronics Technology Co., Ltd., Beijing (CN)

(72) Inventors: Cheng Li, Beijing (CN); Xue Dong, Beijing (CN); Dong Chen, Beijing (CN); Renwei Guo, Beijing (CN); Suzhen Mu, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 13/994,747

(22) PCT Filed: Nov. 16, 2012

(86) PCT No.: PCT/CN2012/084753
§ 371 (c)(1),
(2) Date: Jun. 16, 2013

(87) PCT Pub. No.: WO2013/127199
PCT Pub. Date: Sep. 6, 2013

(65) Prior Publication Data
US 2014/0054630 A1    Feb. 27, 2014

(30) Foreign Application Priority Data
Mar. 2, 2012  (CN) .......................... 2012 1 0054315

(51) Int. Cl.
*H01L 33/00* (2010.01)
*G02F 1/1362* (2006.01)
(Continued)

(52) U.S. Cl.
CPC ........ *G02F 1/136286* (2013.01); *G02F 1/1368* (2013.01); *G02F 1/134363* (2013.01); *G02F 2001/134318* (2013.01)

USPC .................. 257/91; 257/59; 257/72; 257/88; 349/111; 349/113; 349/129; 349/139; 349/141

(58) Field of Classification Search
CPC ............ H01L 27/1214; H01L 27/1251; H01L 27/3248; H01L 27/3251; H01L 27/3258
See application file for complete search history.

(56) References Cited

U.S. PATENT DOCUMENTS

2002/0030782 A1*  3/2002  Lee .............................. 349/143
2005/0128401 A1    6/2005  Lee
(Continued)

FOREIGN PATENT DOCUMENTS

| CN | 1627159 A | 6/2005 |
| CN | 1627160 A | 6/2005 |
| CN | 102629042 A | 8/2012 |

OTHER PUBLICATIONS

The State Intellectual Property Office of the People's Republic of China ("SIPO") (Chinese Language) Office Action issued on Jul. 29, 2013 by SIPO in Chinese Patent Application No. 201210054315.5 ; five (5) pages.
English Translation of SIPO Rejection Decision of Chinese Patent Application No. 201210054315.5 issued on Jan. 10, 2014; five (5) pages.
(Continued)

*Primary Examiner* — Kyoung Lee

(57) ABSTRACT

A TFT-LCD array substrate and a display device. The TFT-LCD array substrate comprises a pixel area the pixel area comprising a plurality of pixel units arranged in an array, and each of the pixel units comprising a first electrode and a second electrode generating a horizontal electric field with the first electrode. The second electrode comprises strip electrodes, and the strip electrodes constitute a radial pattern of a regular triangle, a regular polygon or a circle in each of the pixel units.

12 Claims, 4 Drawing Sheets

(51) Int. Cl.
*G02F 1/1368* (2006.01)
*G02F 1/1343* (2006.01)

(56) References Cited

U.S. PATENT DOCUMENTS

2006/0098150 A1* 5/2006 Lee et al. .................. 349/141
2006/0139546 A1 6/2006 Lee
2014/0054630 A1 2/2014 Li et al.

OTHER PUBLICATIONS

Espacenet Bibliographic Data, Abstract of CN1627160 (A) (listed above in Foreign Patent Documents), 1 page.
Espacenet Bibliographic Data, Abstract of CN1627159 (A) (listed above in Foreign Patent Documents), 1 page.
Espacenet Bibliographic Data, Abstract of CN102629042 (A) (listed above in Foreign Patent Documents), 1 page.
English Translation of SIPO Reexamination of Chinese Patent Application No. 201210054315.5, issued Mar. 7, 2014, five (5) pages.

* cited by examiner

TFT-LCD ARRAY SUBSTRATE AND DISPLAY DEVICE

CROSS REFERENCE TO RELATED APPLICATIONS

This application is based on International Application No. PCT/CN2012/084753 filed on Nov. 16, 2012, which claims priority to Chinese National Application No. 201210054315.5, filed on Mar. 2, 2012, the contents of which are incorporated herein by reference.

FIELD OF THE INVENTION

Embodiments of the invention relates to a TFT-LCD array substrate and a display device.

BACKGROUND

Currently, display modes of Thin Film Transistor Liquid Crystal Display (TFT-LCD) include a Twisted Nematic (TN) mode, a Vertical Alignment (VA) mode, an In-plane-Switching (IPS) mode, an ADS mode and etc.

The ADS mode is a core technology of plane electric field wide viewing angle—Advanced Super Dimension Switch, and its core technical characterization is described as follows: a multi-dimensional electric field is formed by an electric field generated between edges of slit electrodes in the same plane as well as an electric field generated between the slit electrode layer and a plate electrode layers, so that the liquid crystal molecules of all alignment directions between the slit electrodes and right above the electrode in a liquid crystal cell can rotate, thereby improving the liquid crystal working efficiency and increasing the light transmission efficiency. Advanced super dimensional switch technology can improve the picture quality of TFT-LCD products, and have the advantages such as high resolution, high transmittance, low power consumption, wide viewing angle, high aperture ratio, low chromatic aberration, no squeezing water ripple (push Mura). For different applications, ADS technology has some improved techniques, e.g., a high transmittance I-ADS technology, high aperture ratio H-ADS and high resolution S-ADS.

As illustrated in FIG. 1, gate lines 22 and data lines 21 are formed on a TFT-LCD array substrate of existing ADS mode, and adjacent gate lines 22 and data lines 21 define sub-pixel regions (i.e., an R sub-pixel region, a G sub-pixel region, or a B sub-pixel region). Each sub-pixel region is formed with a thin-film transistor (TFT), a strip common electrode 24 and a pixel electrode 25. An insulating layer is disposed between the common electrode 24 and the pixel electrode 25 (not illustrated in the plan view). In the absence of a voltage, no electric field is generated between the common electrode 24 and the pixel electrode 25, and the liquid crystal molecules between the array substrate and the color filter substrate 26 are not deflected; upon a voltage being applied, a horizontal electric filed is generated between the common electrode 24 and the pixel electrode 25, and the liquid crystal molecules 26 are deflected along the direction of the electric field so as to achieve a higher transmission efficiency with a wide viewing angle.

As illustrated in FIG. 2, the TFT-LCD array substrate of the existing ADS mode typically adopts "/\" shape of a dual-domain pixel structure, i.e. the common electrode 34 is of a "/\" shape. Upon a voltage being applied, the liquid crystal molecules have a symmetrical orientation, and the displaying view angle can keep a consistent symmetry within a specific angle. However, when the screen is rotated or is watched from different angles, the display viewing angle is not symmetrical consistently due to the different apparent lengths of the liquid crystal molecules, (e.g., the viewing angle in directions at 0°, 90°, 180° and 270° has a relatively larger difference from that in directions at 45°, 135°, 225° and 315°), thereby resulting in a poor displaying effect.

SUMMARY

An embodiment of the invention provides a thin film transistor liquid crystal display array substrate, comprising a pixel area, the pixel area comprising a plurality of pixel units arranged in an array, each of the pixel units comprising a first electrode and a second electrode generating a horizontal electric field with the first electrode, wherein the second electrode comprises strip electrodes, the strip electrodes constitutes a radial pattern of a regular triangle, a regular polygon or a circle in each of the pixel units.

Another embodiment of the invention provides a thin film transistor liquid crystal display array substrate, comprising a pixel area, the pixel area comprising a plurality of pixel units arranged in an array, each of the pixel units comprising a first electrode and a second electrode generating a horizontal electric field with the first electrode, wherein the second electrode comprises strip electrodes, in each pixel unit, the strip electrodes are extended along at least three directions around a center of the pixel unit and arranged symmetrically with respect to the center of the pixel unit or extended along circles or arcs with the center of the pixel unit as an origin point.

Still another embodiment provides a display device comprising the array substrate according to any embodiment of the invention.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

Figure 1:
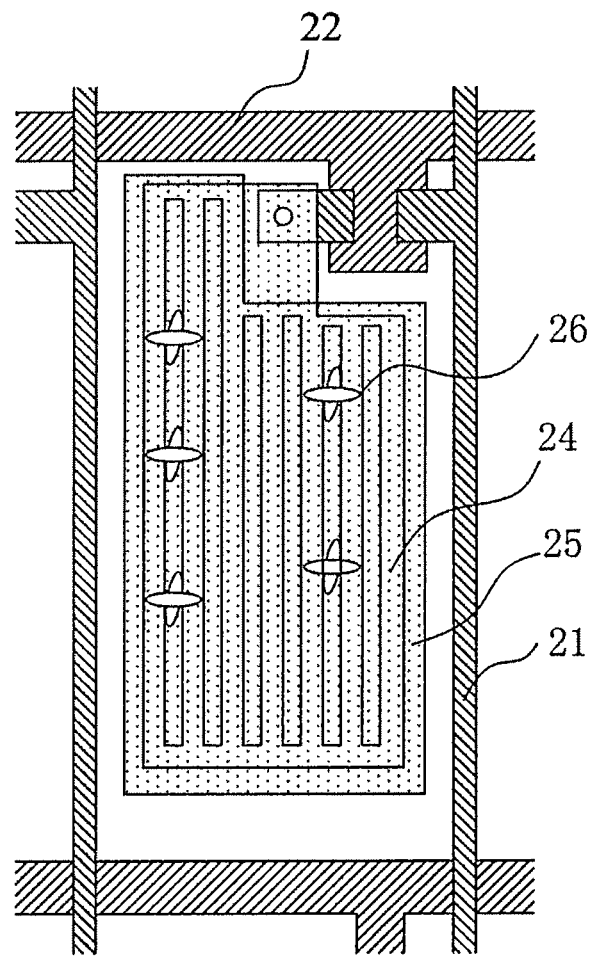
FIG. 1 is a top view of a single domain pixel structure of an array substrate of an ADS mode TFT-LCD in the prior art.
Figure 2:
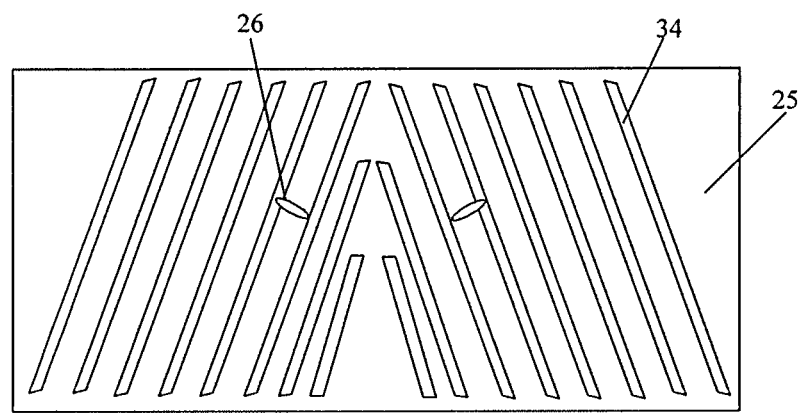
FIG. 2 is a top view of a electrode in a dual-domain pixel structure of an array substrate of an ADS mode TFT-LCD in the prior art.

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

In order to resolve the problems including the inconsistent symmetry of the viewing angle in different directions and the poor displaying effect of the existing ADS mode display panel, the embodiments of the present invention provide a TFT-LCD array substrate and a display device.

The TFT-LCD array substrate according to an embodiment of the present invention includes a pixel region, which includes a plurality of pixel units arranged in an array, and each of the pixel units includes a first electrode and a second electrode which generates a horizontal electric field with the first electrode.

The second electrode includes strip electrodes, and the strip electrodes in the pixel region constitute a regular triangle, a regular polygon or a circle radial pattern.

The pixel unit in the present embodiment of the invention may be one sub-pixel, and can also be a pixel. By taking a RGB three primary color array substrate as an example, the pixel unit is one sub-pixel, which means that one pixel unit on the array substrate is one R sub-pixel, one G sub-pixel, or one B sub-pixel (in this case, the corresponding regions on the array substrate can be referred as a R sub-pixel region, a G sub-pixel region, or a B sub-pixel region). The pixel unit is one pixel means that one pixel unit is an integrity of a pixel composed of R, G, B sub-pixels with three colors on the array substrate (in this case, the corresponding regions on the array substrate may be referred as a pixel region). In each pixel unit, in addition to the above-described first and second electrodes, it also includes a thin film transistor (TFT), etc., which is not design point of the present invention and is not described in detail here.

In the present invention, the first electrode is a planar electrode. The first electrode may be a pixel electrode, and the second electrode may be a common electrode. Alternatively, the first electrode may be a common electrode, and the second electrode may be a pixel electrode. The first electrode is located below the second electrode. Specifically, the first electrode being located below the second electrode means that the first electrode is closer to the base substrate than the second electrode.

For example, in each embodiment of the present invention, a radiation center of the radial pattern is the center of the corresponding pixel unit. In this case, better multi-domain effect can be achieved.

Figure 3:
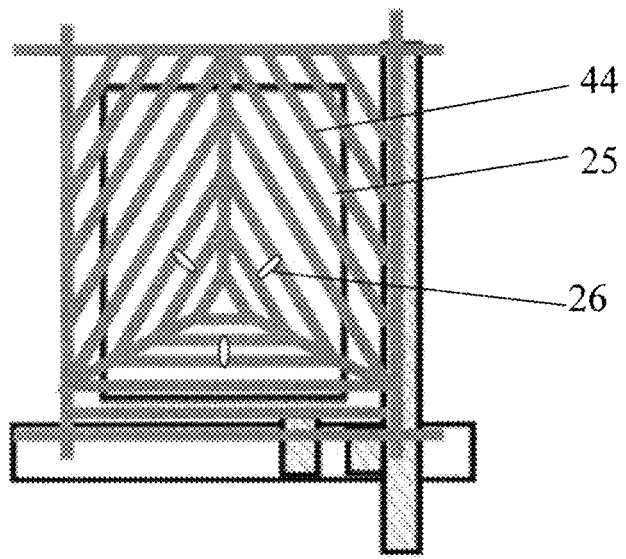
FIG. 3 is a plan view of a pixel structure of a TFT-LCD array substrate according to a first embodiment of the invention.

In the embodiment illustrated in FIG. 3, the common electrode 44 is located above the pixel electrode 25 with an insulating layer interposed therebetween. The common electrode 44 presents a radial arrangement of a regular triangle in each of the R sub-pixel region, the G sub-pixel region, and B sub-pixel region, respectively, and the radiation center are the center of the R sub-pixel region, the center of the G sub-pixel region, or the center of the B sub-pixel region, that is, one pixel unit on the array substrate is one sub-pixel. In order to ensure the uniformity of the horizontal electric field formed between the common electrode 44 and the pixel electrode 25, for example, all of the strip electrodes have a constant width (which is not repeated in the following embodiments). Upon the sub-pixel region being normally driven, a fringe electric field is formed between the pixel electrode 25 and the common electrode 44 due to a voltage difference, which enables most of the liquid crystal molecules 26 are deflected along a horizontal component of the fringe electric field. In this embodiment, the sub-pixel region has a three-domain structure, under the drive of the electric field, the liquid crystal molecules in each of the sub-pixel region 26 are obliquely aligned along three directions. An optical compensation is achieved since there is a symmetrical orientation in a plurality of directions; therefore, when the screen is rotated or is watched from different angles, the display viewing angle is rendered more consistent symmetry, thereby greatly improving the displaying effect.

Figure 4:
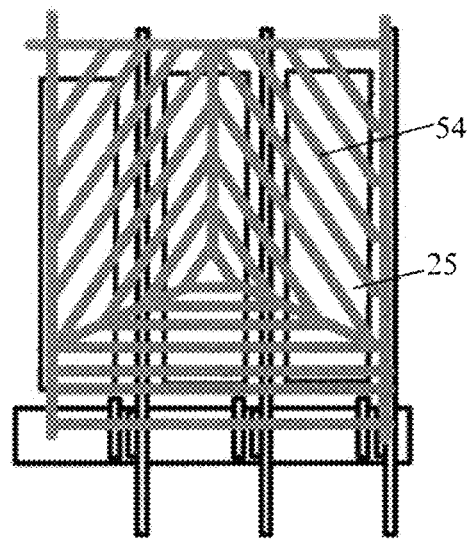
FIG. 4 is a plan view of a pixel structure of a TFT-LCD array substrate according to a second embodiment of the invention.

In the embodiment illustrated in FIG. 4, one pixel unit on the array substrate is a pixel, the common electrode 54 is radially arranged in an regular triangle with the center of the pixel region as the radiation center in each of the whole pixel region (i.e., a pixel composed of a R sub-pixel region, a G sub-pixel region, and a B sub-pixel region). The whole pixel region has a three-domain structure, and the common electrode 54 is distributed uniformly in each sub-pixel region (i.e. the three sides of the regular triangle are distributed uniformly in the sub-pixel regions), which can reduce a color shift phenomenon while achieve the symmetry of the display viewing angle. The following embodiments of FIGS. 6 and 8 have the similar principle, which are not repeated.

Figure 5:
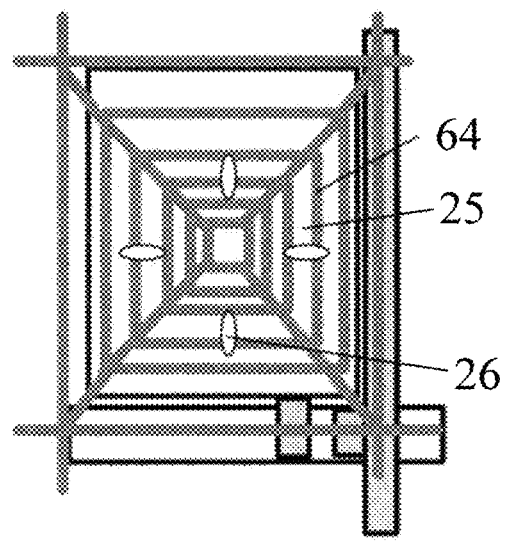
FIG. 5 is a plan view of a pixel structure of a TFT-LCD array substrate according to a third embodiment of the invention.
Figure 6:
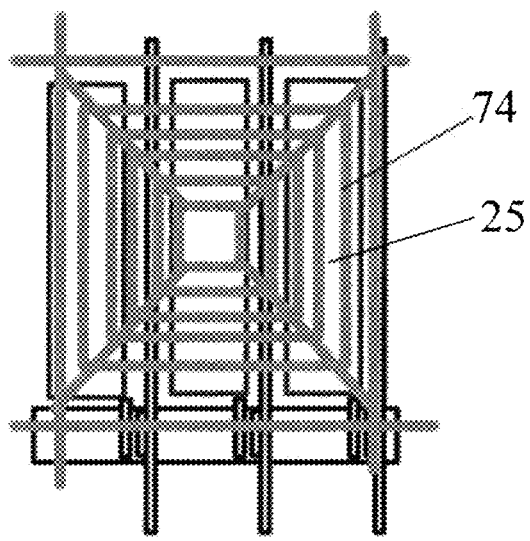
FIG. 6 is a plan view of a pixel structure of a TFT-LCD array substrate according to a fourth embodiment of the invention

In the embodiment illustrated in FIG. 5, the common electrode 64 is radially arranged in a square shape with the center of the sub-pixel region as the radiation center in each sub-pixel region; in the embodiment illustrated in FIG. 6, the common electrode 74 is radially arranged in a square shape with the center of the whole pixel region as the radiation arrangement in each of the whole pixel region.

Since the sides of the even-numbered regular polygon are disposed in symmetry, the actual number of pixel domains in FIGS. 5 and 6 is two (Similarly, the actual number of pixel domains for the regular hexagon structure is three, and so on). However, even for the two domains, it is different from the dual-domain structure in the prior art, a consistent symmetry can be achieve between the viewing angle at 0°, 90°, 180° and 270° and the viewing angle at 45°, 135°, 225° and 315°.

In theory, the increasing number of domains helps to improve the symmetry of the display viewing angle and eliminate color shift. Therefore, the number of the sides of the regular polygon is preferred to be an odd number, and then the domain number is the actual number of the sides. For example, the domain number of a regular pentagon is five.

Figure 7:
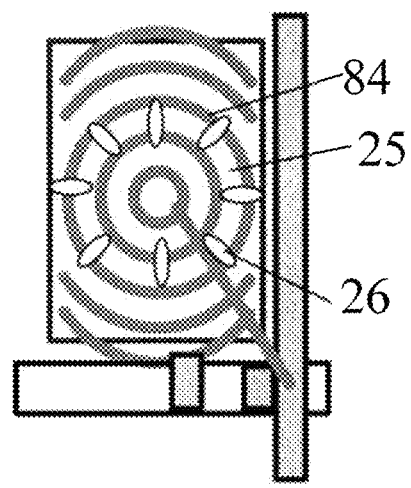
FIG. 7 is a plan view of a pixel structure of a TFT-LCD array substrate according to a fifth embodiment of the invention.
Figure 8:
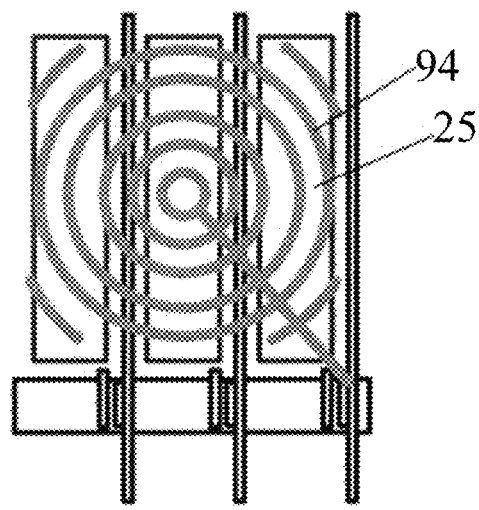
FIG. 8 is a plan view of a pixel structure of a TFT-LCD array substrate according to a sixth embodiment of the invention.

FIG. 7 and FIG. 8 illustrate two additional embodiments of the present invention. In FIG. 7, a common electrode 84 in each sub-pixel region is radially arranged in a circle shape with the center of the sub-pixel region as the radiation center. In the embodiment illustrated in FIG. 8, a common electrode 94 in each whole pixel region is radially arranged in a circle shape with the center of the whole pixel region as the radiation center. This design is a case in which the number of regular polygon sides is increased to an infinity limit, and the display viewing angle of the display panel shows a consistent symmetry in all of the directions within 360°.

In the above radial patterns, the radial patterns include nested regular triangles, regular polygons or circles with gradually increased size, as illustrated in FIGS. 3-8. Of course, in order to make the overall outline of the radial pattern consistent with the outline of the pixel region, the peripheral regular triangle, regular polygonal or circle may be only a segment of these patterns, like the arc illustrated in FIG. 8.

In one embodiment, the interval between every two adjacent nested patterns can be substantially constant.

Further, the strip electrodes with the above nested patterns can be connected to one another with a strip electrode crossing with these patters.

Although FIGS. 4, 6 and 8 illustrate only the case in which an electrode with radial pattern exists in a pixel including three sub-pixels, however, each pixel may include two or four or more sub-pixels. In addition, although these drawings illustrate only the electrode having a radial pattern is a common electrode, however, the electrode can also be a pixel electrode. It should be noted that, since the pixel electrode of each sub-pixel needs to be connected to a corresponding thin film transistor, the pixel electrode with a radial pattern in the whole pixel is disconnected at the boundary between the adjacent sub-pixels.

Further, another embodiment of the invention provides a thin film transistor liquid crystal display array substrate. The array substrate includes a pixel area, and the pixel region includes a plurality of pixel units arranged in an array. Each pixel unit includes a first electrode and a second electrode generating a horizontal electric field with the first electrode, wherein the second electrode includes strip electrodes, in each pixel unit, the strip electrodes are extended along at least three directions around a center of the pixel unit and arranged symmetrically with respect to the center of the pixel unit or extended along circles or arcs with the center of the pixel unit as an origin point. Other structures or features according to the present embodiment can be the same as those in the above embodiments, which are note repeated here.

An embodiment of the invention also provides a display device including a TFT-LCD array substrate described above. The display device may be: liquid crystal panel, e-paper, liquid crystal TV, liquid crystal display, digital photo frame, mobile phone, tablet computer, or any other product or part with a display function.

Embodiments of the present invention can at least provide the following structures:

(1) A thin film transistor liquid crystal display array substrate, comprising a pixel area, the pixel area comprising a plurality of pixel units arranged in an array, each of the pixel units comprising a first electrode and a second electrode which generates a horizontal electric field with the first electrode,
wherein the second electrode comprises strip electrodes, the strip electrodes constitute a radial pattern of a regular triangle, a regular polygon or a circle in each of the pixel units.

(2) The array substrate according to (1), wherein the second electrode is located above the first electrode.

(3) The array substrate according to (1) or (2), wherein a radiation center of the radial pattern is consistent with a center of the corresponding pixel unit.

(4) The array substrate according to any of (1) to (3), wherein each pixel unit is a sub-pixel or a pixel including a plurality of sub-pixels.

(5) The array substrate according to any of (1) to (4), wherein the radial pattern is in a shape of regular polygon having an odd number of sides.

(6) The array substrate according to any of (1) to (5), wherein any two of the strip electrodes have an equal width.

(7) The array substrate according to any of (I) to (6), wherein the first electrode is a planar electrode.

(8) The array substrate according to any of (1) to (7), wherein the first electrode is a pixel electrode, and the second electrode is a common electrode.

(9) The array substrate according to any of (1) to (7), wherein the first electrode is a common electrode, and the second electrode is a pixel electrode.

(10) The array substrate according to (9), wherein each of the pixel units is a pixel including a plurality of sub-pixels, and the radial pattern of the pixel electrode is disconnected at a boundary between every two adjacent sub-pixels.

(11) The array substrate according to any of (1) to (10), wherein the radial pattern comprises nested regular triangles, regular polygons or circles with gradually increased size.

(12) The array substrate according to (11), wherein the nested regular triangles, regular polygons or circles are connected to one another with a strip electrode crossing with these regular triangles, regular polygons or circles.

(13) A thin film transistor liquid crystal display array substrate, comprising a pixel area, the pixel area comprising a plurality of pixel units arranged in an array, each of the pixel units comprising a first electrode and a second electrode which generates a horizontal electric field with the first electrode,
wherein the second electrode comprises strip electrodes, in each pixel unit, the strip electrodes are extended along at least three directions around a center of the pixel unit and arranged symmetrically with respect to the center of the pixel unit or extended along circles or arcs with the center of the pixel unit as an origin point.

(14) The array substrate according to (13), wherein the second electrode is located above the first electrode.

(15) A display device comprising the array substrate according to any of (1) to (14).

The foregoing are merely exemplary embodiments of the invention, but not used to limit the protection scope of the invention. The protection scope of the invention is defined by attached claims.

What is claimed is:

1. A thin film transistor liquid crystal display array substrate, comprising a pixel area, the pixel area comprising a plurality of pixel units arranged in an array, each of the pixel units comprising a first electrode and a second electrode which generates a horizontal electric field with the first electrode,
   wherein the second electrode comprises strip electrodes, the strip electrodes constitute a radial pattern of a regular polygon in each of the pixel units,
   wherein the radial pattern is in a shape of regular polygon having an odd number of sides.

2. The array substrate according to claim 1, wherein the second electrode is located above the first electrode.

3. The array substrate according to claim 1, wherein a radiation center of the radial pattern is consistent with a center of the corresponding pixel unit.

4. The array substrate according to claim 1, wherein each pixel unit is a sub-pixel or a pixel including a plurality of sub-pixels.

5. The array substrate according to claim 1, wherein any two of the strip electrodes have an equal width.

6. The array substrate according to claim 1, wherein the first electrode is a planar electrode.

7. The array substrate according to claim 1, wherein the first electrode is a pixel electrode, and the second electrode is a common electrode.

8. The array substrate according to claim 1, wherein the first electrode is a common electrode, and the second electrode is a pixel electrode.

9. The array substrate according to claim 8, wherein each of the pixel units is a pixel including a plurality of sub-pixels, and the radial pattern of the pixel electrode is disconnected at a boundary between every two adjacent sub-pixels.

10. The array substrate according to claim 1, wherein the radial pattern comprises nested regular polygons with gradually increased size.

11. The array substrate according to claim 10, wherein the nested, regular polygons are connected to one another with a strip electrode crossing with these regular polygons.

12. A display device comprising the array substrate according to claim 1.

* * * * *